United States Patent
Hong

(10) Patent No.: US 8,225,008 B2
(45) Date of Patent: Jul. 17, 2012

(54) IMAGE DISPLAY DEVICE FOR CONTROLLING EXTERNAL DEVICE THROUGH REGISTRATION OF CONTROL OWNERSHIP AND METHOD THEREOF

(75) Inventor: Jin-hyuck Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 752 days.

(21) Appl. No.: 11/836,441

(22) Filed: Aug. 9, 2007

(65) Prior Publication Data

US 2008/0155131 A1 Jun. 26, 2008

(30) Foreign Application Priority Data

Dec. 21, 2006 (KR) .................. 10-2006-0131648

(51) Int. Cl.
*G06F 3/00* (2006.01)
*G06F 15/16* (2006.01)
(52) U.S. Cl. .............. 710/15; 710/16; 710/40; 710/110; 709/208; 709/209; 709/211; 712/28; 712/29
(58) Field of Classification Search .................. None
See application file for complete search history.

(56) References Cited

U.S. PATENT DOCUMENTS

| | | | |
|---|---|---|---|
| 6,463,540 B1 * | 10/2002 | Lelong et al. .................... | 726/17 |
| 6,487,589 B1 | 11/2002 | Yoshino et al. | |
| 6,704,819 B1 * | 3/2004 | Chrysanthakopoulos .... | 710/240 |
| 6,804,734 B2 * | 10/2004 | Kimura ......................... | 710/106 |
| 6,925,500 B1 | 8/2005 | Mizutani et al. | |
| 2001/0051930 A1 * | 12/2001 | Nakamura ...................... | 705/56 |
| 2003/0037151 A1 | 2/2003 | Montvay et al. | |
| 2003/0188108 A1 * | 10/2003 | Damron et al. ................ | 711/147 |

FOREIGN PATENT DOCUMENTS

| | | |
|---|---|---|
| CN | 1245379 A | 2/2000 |
| EP | 1130860 A2 | 9/2001 |
| EP | 1284553 A2 | 2/2003 |
| EP | 1684518 A2 | 7/2006 |
| WO | 98/17033 A1 | 4/1998 |

OTHER PUBLICATIONS

Communication from the State Intellectual Property Office of P.R. China in counterpart Chinese Application No. 200710180162.8, issued May 5, 2010.

* cited by examiner

*Primary Examiner* — Eron J Sorrell
*Assistant Examiner* — Dean Phan
(74) *Attorney, Agent, or Firm* — Sughrue Mion, PLLC

(57) ABSTRACT

An image display device that controls an external device and a method therefore are provided. The image display device includes an interface unit which is connected to an external device, a determining unit which determines whether another external device that has a control ownership of the external device exists, and a control unit which registers the control ownership of the external device if it is determined that the other external device does not exist. The external device is controlled by registering the control ownership.

12 Claims, 5 Drawing Sheets

IMAGE DISPLAY DEVICE FOR CONTROLLING EXTERNAL DEVICE THROUGH REGISTRATION OF CONTROL OWNERSHIP AND METHOD THEREOF

CROSS-REFERENCE TO RELATED APPLICATIONS

This application claims priority from Korean Patent Application No. 10-2006-0131648, filed on Dec. 21, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to displaying images, and more particularly, to controlling an external device through registration of a control ownership.

2. Description of the Related Art

Recently, various kinds of digital devices have appeared, and Institute of Electrical and Electronics Engineers (IEEE) 1394 is being looked to as a digital interface for constructing a network among such devices. In particular, the IEEE 1394 has become a matter of greater concern as it is recognized as the sole standard for transmitting High Definition (HD) streams in a digital television field.

The IEEE 1394 is the standard of a serial interface standardized by the Institute of Electrical and Electronics Engineers. Three kinds of data transfer rates, e.g., 100 MB, 200 MB and 400 MB per second, have been prescribed. The IEEE 1394 supports a hot plug-in function that enables slave devices to be directly connected to a host device which is in operation, and in this case, sixty-three slave devices can be connected to the host device at maximum. Data transmission can be classified into two types: isochronous transmission and asynchronous transmission. The isochronous transmission is a real-time transmission, and thus it is suitable to an interface for transmitting multimedia information that requires simultaneity such as a moving image or voice. The asynchronous transmission divides data and transmits the divided data, and thus it can be used to transfer data between a personal computer and a peripheral device, such as a printer.

An IEEE 1394 interface connects a video camera, an audio appliance, a television receiver, a video cassette recorder (VCR), a set-top box, an audio/video hard disk drive (AVHDD), a DVHS, an MPEG camcorder, a personal computer, and a digital television receiver in a group, and all the connected devices can perform data transmission/reception with one another.

The digital television receiver can read data stored in the AVHDD, and play and display the read data on its screen by transmitting a playback command to the AVHDD through the IEEE 1394 interface.

On the other hand, the number of external devices that can be connected to a storage device such as the AVHDD is limited. Accordingly, an output signal of an external device that selects the AVHDD is under the control of the external device that has finally transmitted the playback command to the AVHDD.

For example, if a data playback command is inputted from the personal computer while the digital television receiver reads the data stored in the AVHDD and plays the read data on the screen, an output signal according to the playback command of the personal computer is provided to the screen of the digital television receiver. In other words, the digital television receiver cannot control the AVHDD, but can only monitor the output signal according to the control of the personal computer.

Accordingly, the digital television receiver is unable to stably receive the desired data from the AVHDD.

SUMMARY OF THE INVENTION

Exemplary embodiments of the present invention addresses the above disadvantages and other disadvantages not described above. Also, the present invention is not required to overcome the disadvantages described above, and an exemplary embodiment of the present invention may not overcome any of the problems described above.

The present invention provides an image display device and a method thereof, which can stably receive desired data from an external device through registration of a control ownership of the external device intended to be controlled among external devices connected through an interface.

The foregoing and other objects are substantially realized by providing an image display device, according to as aspect of the present invention, which comprises an interface unit which is connected to a first external device; a determining unit which determines whether a second external device that has a control ownership of the first external device exists; and a control unit which registers the control ownership of the first external device if it is determined that the second external device does not exist.

The control unit may receive a signal outputted from the first external device under the control of the second external device if the second external device exists.

The image display device according to an aspect of the present invention may further comprise a user interface unit which receives an input of a selection command; wherein if the selection command is inputted in a state that the control ownership is registered in the first external device, the control unit controls an operation of the first external device in accordance with the selection command.

The image display device according to an aspect of the present invention may further comprise a user interface unit which receives an input of a selection command; wherein if the second external device exists, the control unit transmits a request message for requesting a change of registration of the control ownership of the first external device to the second external device.

If the control unit receives an approval message from the second external device in response to the request message, the control unit may change the registration of the control ownership of the first external device.

The image display device according to as aspect of the present invention may further comprise a user interface unit which receives an input of a selection command; and a device list generation unit which generates a device list of a plurality of external devices connected through the interface unit if the selection command is inputted; wherein if one of the plurality of external devices in the device list is selected, the control unit transmits a request message for inquiring whether the control ownership exists to the selected external device.

The external device may be at least one of an MPEG camcorder, an audio/video hard disk drive (AVHDD), and a D-VHS, and the second external device may be at least one of a DTV, a PC, and a set-top box.

The interface unit may be an IEEE 1394 interface.

According to another aspect of the present invention, there is provided a storage device, which comprises an IEEE 1394 interface unit; a registration storage unit which registers information on a first external device having a control ownership of the storage device itself among a plurality of external devices connected through the IEEE 1394 interface unit; and a data processing unit which outputs data under the control of the registered first external device.

According to still another aspect of the present invention, there is provided a method of controlling a first external device of an image display device which is connected to the first external device, which comprises judging whether a second external device that has a control ownership of the external device exists; and registering the control ownership of the first external device if it is determined that the second external device does not exist.

The method according to an aspect of the present invention may further comprise controlling an operation of the first external device in accordance with a selection command if the selection command is inputted in a state that the control ownership is registered in the first external device.

The method according to an aspect of the present invention may further comprise receiving a signal outputted from the first external device under the control of the second external device if it is determined that the second external device exists.

The method according to an aspect of the present invention may further comprise transmitting a request message for requesting a change of registration of the control ownership of the first external device to the second external device if it is determined that the second external device exists.

The method according to an aspect of the present invention may further comprise changing the registration of the control ownership of the first external device if an approval message is received from the second external device in response to the request message; and displaying an error message on a display screen if the approval message is not received from the second external device in response to the request message.

The method according to an aspect of the present invention may further comprise receiving an input of a command to display a device list of the plurality of connected external devices; and generating and displaying the device list of the plurality of connected external devices.

The judging may comprise judging whether the second external device having the control ownership of the selected external device exists if one of the plurality of external devices in the displayed device list is selected.

The external device may be at least one of an MPEG camcorder, an audio/video hard disk drive (AVHDD), and a D-VHS, and the second external device may be at least one of a DTV, a PC, and a set-top box.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
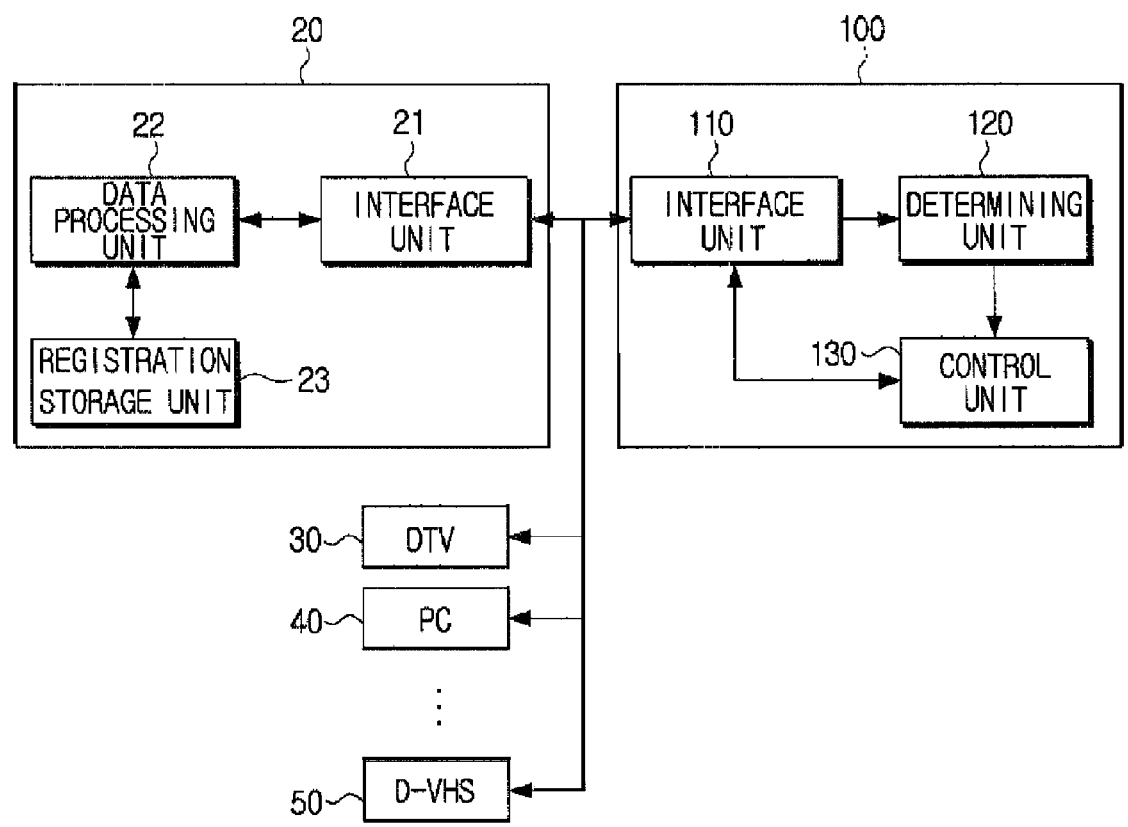
FIG. 1 is a block diagram illustrating the construction of an image display device and an external device according to an exemplary embodiment of the present invention.

Certain exemplary embodiments of the present invention will be described in greater detail with reference to the accompanying drawings.

In the following description, like drawing reference numerals are used for like elements throughout the specification. The matters defined in the description such as a detailed construction and elements are provided to assist in a comprehensive understanding of the invention. However, the present invention can be carried out in different manners. Also, well-known functions or constructions are not described in detail since they would obscure the invention in unnecessary detail.

FIG. 1 is a block diagram illustrating the construction of an image display device and an external device according to an exemplary embodiment of the present invention.

Referring to FIG. 1, the image display device 100 according to an exemplary embodiment of the present invention comprises an interface unit 110, a determining unit 120, and a control unit 130. Also, the external device 20 comprises an interface unit 21, a data processing unit 22, and a registration storage unit 23.

The image display unit 100 is connected to the external device 20 through the interface unit 110 and the interface unit 21, and may also be connected to another external device (not illustrated). Here, the other external device may be another image display device such as a DTV, a PC, a set-top box, and so forth.

The interface units 110 and 21 may be IEEE 1394 interfaces connected in the IEEE 1394 standard, and all devices connected through the IEEE 1394 interface can communicate with one another.

The interface unit 110 is connected to the external device 20, and transmits/receives data to/from the external device 20. Here, the data may be a packet signal such as a request/response message, a video/audio signal, a control signal for the video/audio signal, and so forth.

The determining unit 120 determines whether another external device having a control ownership of the external device 20 exists. In this case, the determination can be made by confirming information stored in the registration storage unit 23 of the external device 20.

Specifically, the determining unit 120 can determine the existence of another external device having the control ownership of the external device 20 by transmitting a command signal and a request message for inquiring whether the control ownership exists to the external device 20 through the IEEE 1394 interface and by receiving a response message from the external device 20.

If the determining unit 120 determines that another external device does not exist, the control unit 130 registers the control ownership of the external device 20. At this time, the registration is performed by storing an identifier (ID) of the image display device 100 in the external device 20.

The registration storage unit 23 of the external device 20 registers information on the external device that has the control ownership of the external device 20 itself among external devices connected through the interface unit 21. Here, the information on the external device may be the ID of the external device.

Referring to FIG. 1, when the data processing unit 22 of the external device 20 receives a request for control ownership registration from the control unit 130 of the image display device 100, it confirms whether the external device information is stored in the registration storage unit 23. If no information is stored in the registration storage unit 23, the data processing unit 22 stores the ID of the image display device 100 in the registration storage unit 23, and outputs data under the control of the image display device 100 registered in the registration storage unit 23.

Here, the external device 20 may be a storage device such as an MPEG camcorder, an audio/video hard disk drive (AVHDD), a D-VHS (Data-Video Home system), and so forth.

Figure 2:
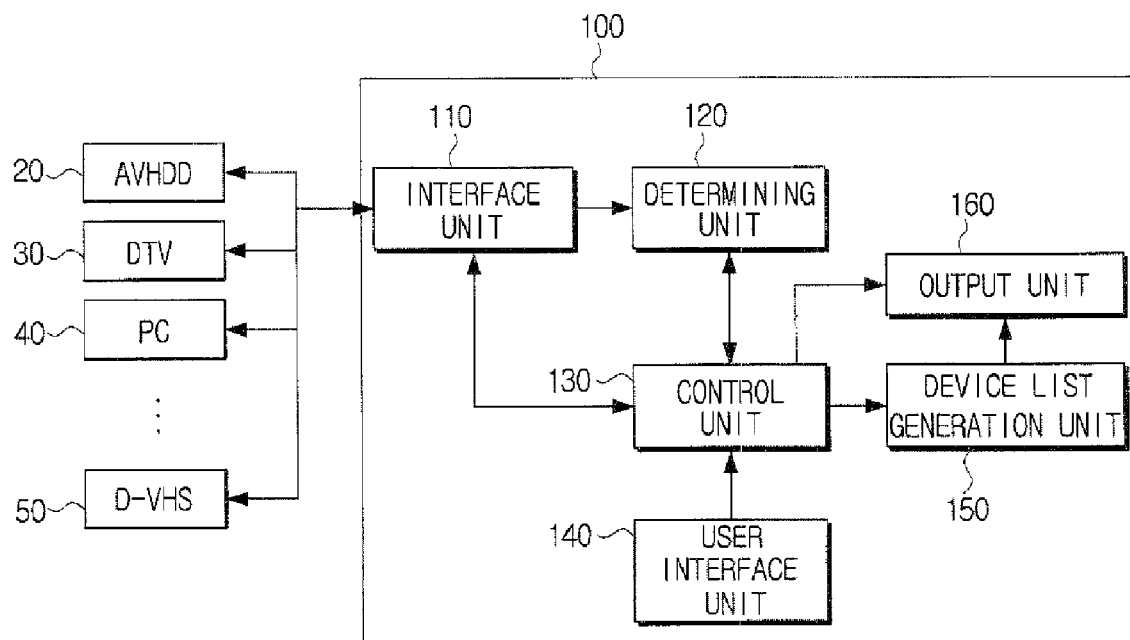
FIG. 2 is a block diagram illustrating the detailed construction of the image display device of FIG. 1.

FIG. 2 is a block diagram illustrating the detailed construction of the image display device of FIG. 1.

The image display device 100 of FIG. 2 further comprises a user interface unit 140, a device list generation unit 150, and an output unit 160 in addition to the construction of the image display device 100 of FIG. 1.

Referring to FIG. 2, the image display device 100 is physically connected to a plurality of external devices 20 to 50 through the IEEE 1394 interface.

In this case, the external devices may be storage devices such as an MPEG camcorder, an AVHDD, and a D-VHS, and playback devices such as a DTV, a PC, and a set-top box. Also, the external device that is the storage device may have the same construction as the external device 20, and the external device that is the playback device may have the same construction as the image display device 100.

The user interface unit 140 receives an input of a selection command. Here, the selection command may be a control command for controlling the external devices 20 to 50 connected to the IEEE 1394 interface and the image display device 100, a request/response message transmission command, and so forth.

If a device list display command is inputted through the user interface unit 140, the device list generation unit 150 generates ID numbers and device names of the external devices connected through the interface unit 110.

On the other hand, the interface unit 110 according to the IEEE 1394 standard is reset whenever the external devices are additionally connected and disconnected, and the IDs of the external devices may be changed whenever the interface unit 110 is reset.

The device list generation unit 150 generates the device list by using the IDs of the external device which are changed whenever the interface 110 is reset.

The output unit 160 displays the device list generated by the device list generation unit 150. That is, the output unit 160 displays the IDs and the device names of the external devices 20 to 50 connected through the interface unit 110.

If one of the external devices 20 is selected from the device list, the control unit 130 transmits a request message for inquiring whether the control ownership exists to the external device 20.

The determining unit 120 determines whether the control ownership exists in accordance with the response to the request message that is received from the selected external device 20.

If it is determined that the control ownership exists, the control unit 130 receives a signal outputted from the external device 20 and outputs the received signal through the output unit 160 under the control of the other external device that has the control ownership. That is, the control unit 130 only monitors the output signal of the other external device that is displayed through the output unit 160.

If the determining unit 120 determines that another external device having the control ownership does not exist, the control unit 130 registers the control ownership by transmitting a control ownership registration request message to the external device 20.

The control unit 130 can control the video/audio signal stored in the external device 20 by transmitting the control signal to the external device 20 in a state that the control ownership is registered in the external device 20. Here, the control signal may be a video/audio signal playback command, a stop command, a pause command, and so forth.

On the other hand, if a control signal transmission command is inputted to the external device 20 through the user interface unit 140 in a state that the control ownership does not exist, the control unit 130 controls the output unit 160 to display an error message for reporting that the control ownership does not exist on the display screen.

If the selection command is inputted from the user through the user interface unit 140 in response to the request for the control ownership registration, the control unit 130 transmits a request message for requesting the change of registration of the control ownership of the external device 20 to the other external device.

If the approval message is received from the other external device in response to the request message, the control unit 130 can control the external device 20 by changing the registration of the control ownership of the external device 20. In other words, the ID of the image display device 100 is stored in the registration storage unit 23 of the external device 20.

Figure 3:
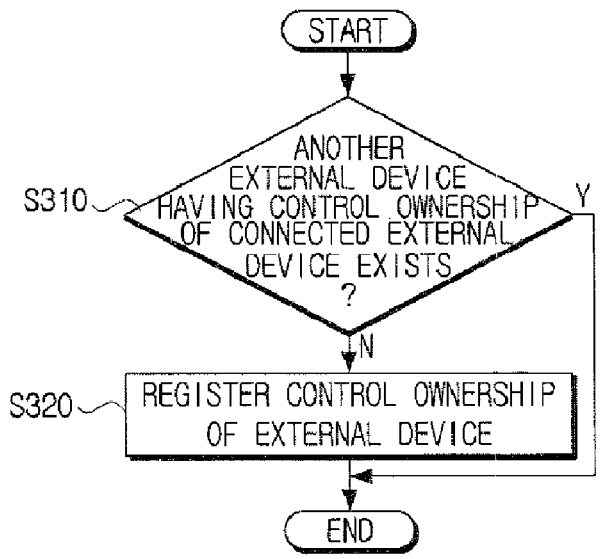
FIG. 3 is a flowchart illustrating a method of controlling an external device of an image display device according to an exemplary embodiment of the present invention.

FIG. 3 is a flowchart illustrating a method of controlling an external device of an image display device according to an exemplary embodiment of the present invention.

Referring to FIG. 3, it is determined whether another external device having a control ownership of an external device connected to the image display device exists in operation S310.

Here, the determination can be made by transmitting a command signal and a request message for inquiring whether the control ownership exists to the external device through an interface and by receiving a response message to the request message.

If it is determined that another external device having control ownership does not exist, the control ownership of the external device is registered in operation S320. Accordingly, the external device can be controlled without interfering with the other external device.

Here, the external device connected to the image display device may be a storage device such as an MPEG camcorder, an AVHDD, a D-VHS, and so forth, and the external device which is determined to determine if it has control of the external device connected to the image display device may be a playback device such as a DTV, a PC, a set-top box, and so forth.

Figure 4:
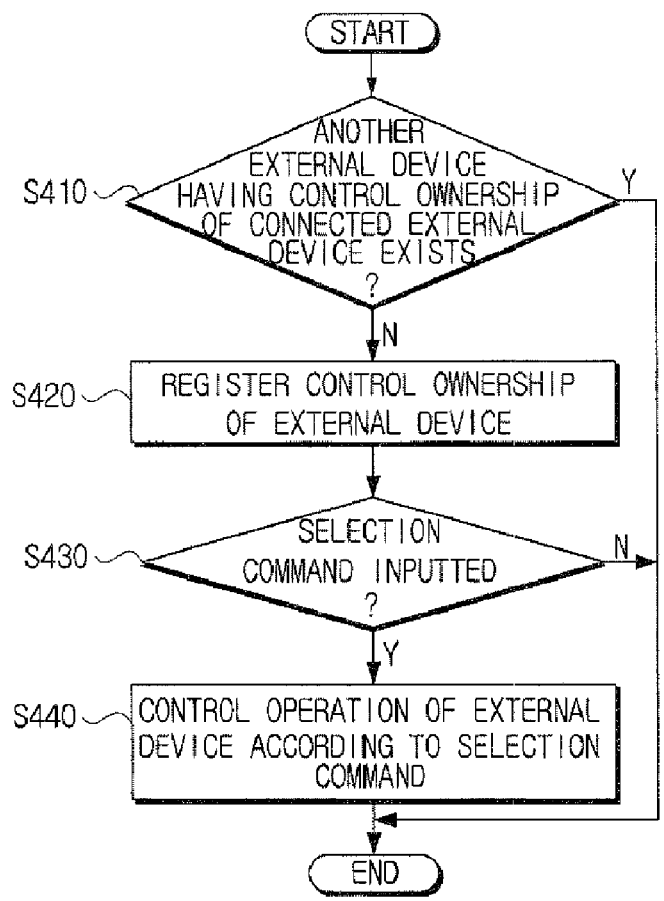
FIG. 4 is a flowchart illustrating a method of controlling an external device of an image display device according to another exemplary embodiment of the present invention.

FIG. 4 is a flowchart illustrating a method of controlling an external device of an image display device according to another exemplary embodiment of the present invention.

In FIG. 4, operations S410 and S420 are the same as the operations S310 and S320 as illustrated in FIG. 3. If a selection command is inputted in operation S430, in a state that it is determined that another external device having the control ownership of the external device does not exist, the operation of the external device can be controlled in accordance with the selection command in operation S440.

Here, the selection command is a control command for the video/audio signal stored in the external device, and may be a playback command, a stop command, a pause command, and so forth.

Figure 5:
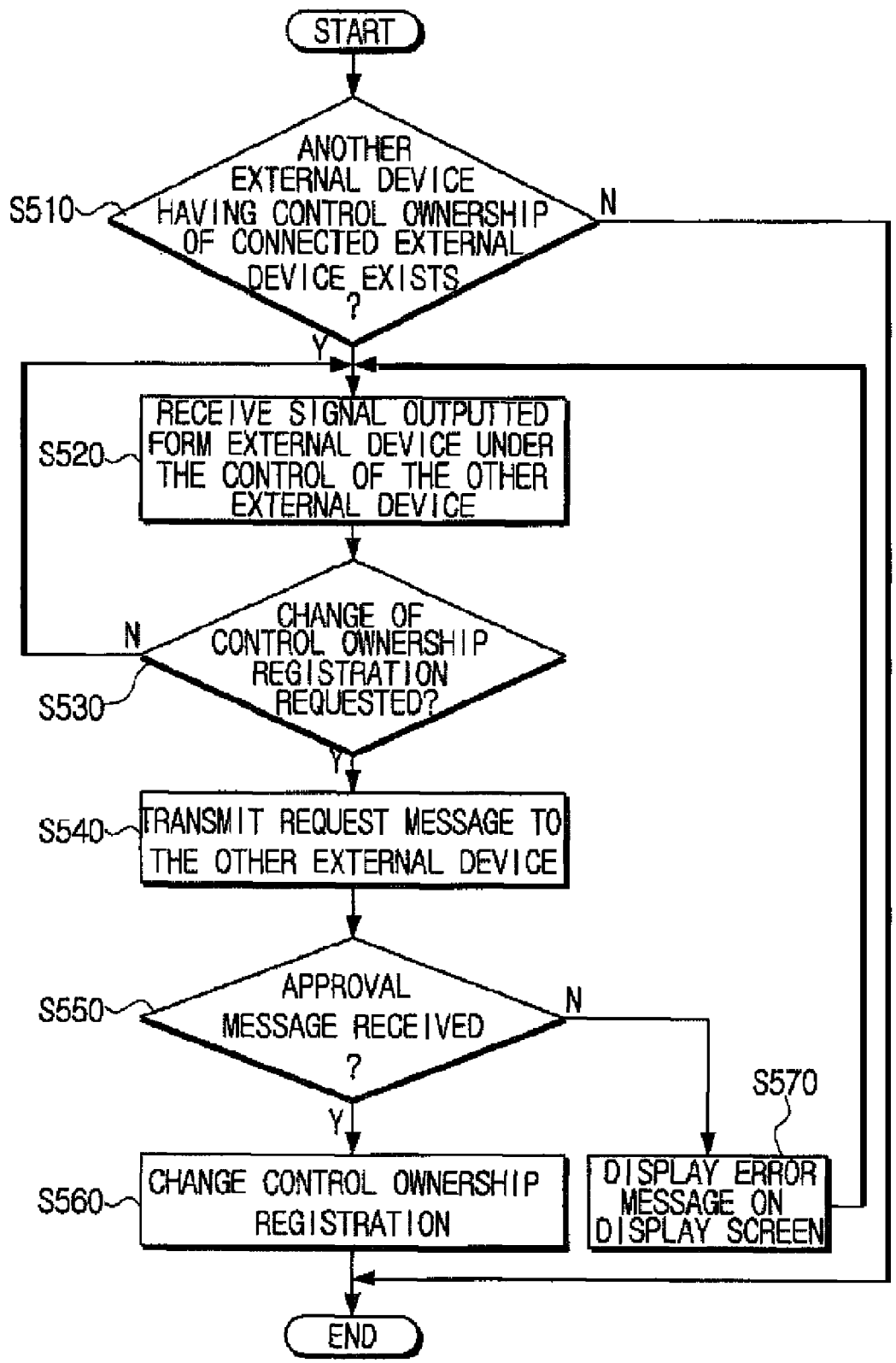
FIG. 5 is a flowchart illustrating a method of controlling an external device of an image display device according to still another exemplary embodiment of the present invention.

FIG. 5 is a flowchart illustrating a method of controlling an external device of an image display device according to still another exemplary embodiment of the present invention.

Referring to FIG. 5, it is determined whether another external device that has the control ownership of an external device connected through an interface exists in operation S510, and if it is determined that another external device exists, the signal outputted from the external device is received and outputted on the display screen under the control of the other external device in operation S520.

If a request for a change of a control ownership registration is inputted in operation S530, the corresponding request message is transmitted to the other external device in operation S540. On the other hand, if no request is inputted, the output signal of the other external device is monitored only.

If an approval message is received in response to the transmitted request message in operation S550, the external device can be controlled through the change of the control ownership registration in operation S560. If the approval message is not received, an error message is displayed on the display screen in operation S570, and the signal outputted from the external device is continuously received under the control of the other external device in operation S520.

Figure 6:
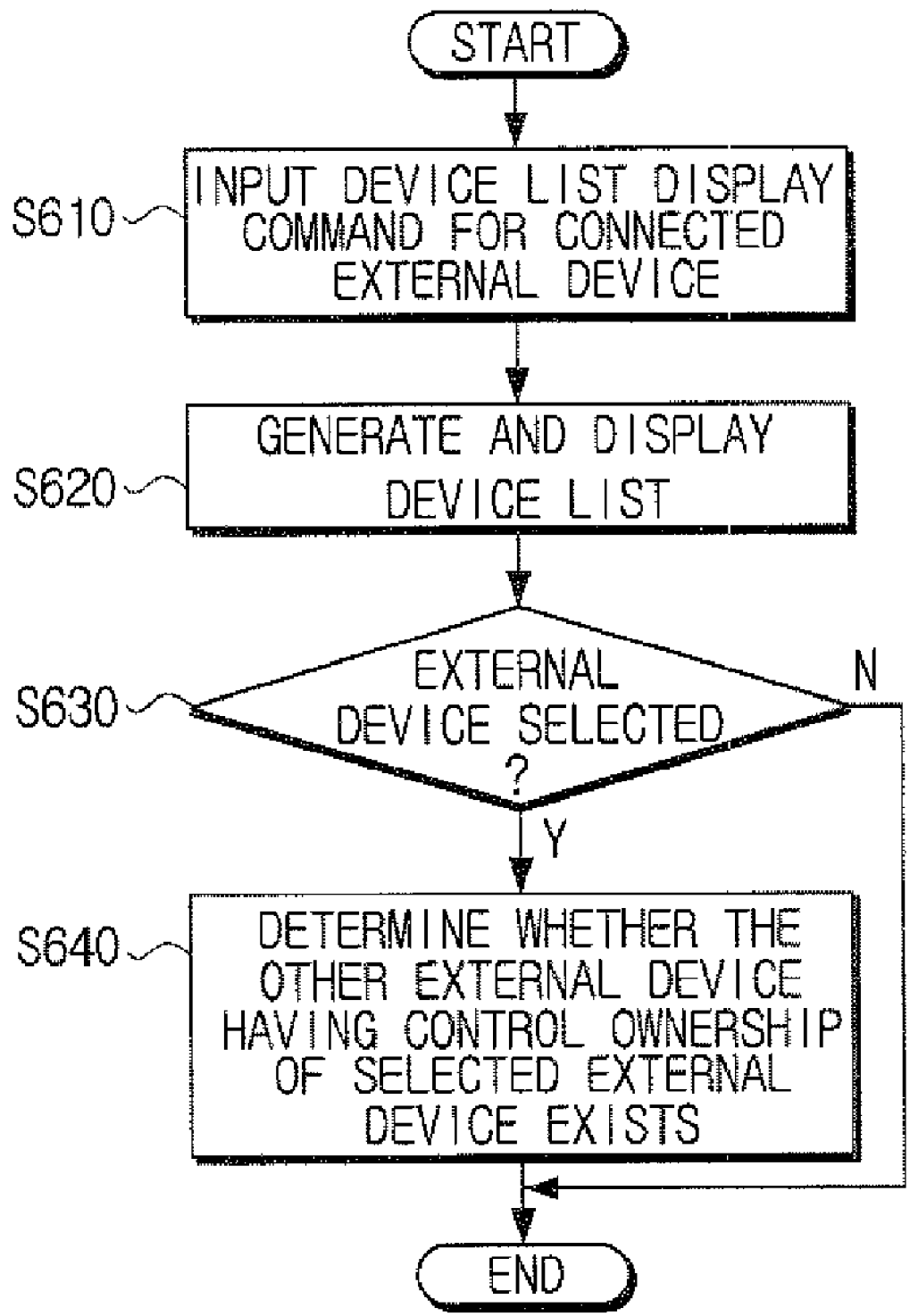
FIG. 6 is a flowchart illustrating a process of selecting an external device to be controlled as illustrated in FIGS. 3 to 5.

FIG. 6 is a flowchart illustrating a process of selecting an external device to be controlled as illustrated in FIGS. 3 to 5.

Referring to FIG. 6, if a device list display command is received with respect to an external device connected through the IEEE 1394 interface in operation S610, a device list of all connected external devices is generated and displayed in operation S620. In this case, the external devices in the display list are classified in accordance with their types, and the IDs and device names of the external devices are displayed.

If one of the external devices in the displayed device list is selected in operation S630, a request message for inquiring whether a control ownership exists is transmitted to the external device.

Thereafter, if a response message to the request message is received, it is determined whether another external device that has the control ownership of the selected external device exists in accordance with the received response message in operation S640. Then, whether to register the control ownership is determined in accordance with the result of determination.

As described above, according to the exemplary embodiments of the present invention, the control ownership can be registered in the external device to be controlled among the external devices connected through the IEEE 1394 interface. Accordingly, desired data can be stably received from the external device.

The foregoing embodiments are merely exemplary and are not to be construed as limiting the present invention. The present teachings can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image display device comprising:
   an interface unit which is connected to a first external device;
   a determining unit which determines whether a second external device having a control ownership of the first external device exists;
   a control unit which registers, in the first external device, the control ownership of the first external device by storing an identifier of the image display device in the first external device, if it is determined that the second external device having the control ownership of the first external device does not exist;
   a user interface unit which receives an input of a selection command; and
   a device list generation unit which generates a device list of a plurality of external devices connected through the interface unit if the selection command is inputted,
   wherein if it is determined that the second external device having the control ownership of the first external device exists, the control unit transmits a request message requesting a change of registration of the control ownership of the first external device to the second external device,
   wherein if one of the plurality of external devices in the device list is selected, the control unit transmits a request message, to the selected external device, inquiring whether the control ownership exists in the selected external device.

2. The image display device of claim 1, wherein the control unit receives a signal outputted from the first external device under the control of the second external device if the second external device having the control ownership of the first external device exists.

3. The image display device of claim 1,
   wherein if the selection command is inputted in a state that the control ownership is registered in the first external device, the control unit controls an operation of the first external device in accordance with the selection command.

4. The image display device of claim 1, wherein if the control unit receives an approval message from the second external device in response to the request message, the control unit changes the registration of the control ownership of the first external device.

5. The image display device of claim 1, wherein the first external device is at least one of an MPEG camcorder, an audio/video hard disk drive (AVHDD), and a D-VHS, and the second external device is at least one of a DTV, a PC, and a set-top box.

6. A method of controlling a first external device of an image display device which is connected to the first external device, the method comprising:
   judging whether a second external device having a control ownership of the first external device exists;
   registering, in the first external device, the control ownership of the first external device by storing an identifier of the image display device, if it is determined that the second external device having the control ownership of the first external device does not exist;
   transmitting a request message requesting a change of registration of the control ownership of the first external device to the second external device if it is determined that the second external device having the control ownership of the first external device exists;
   receiving an input of a command to display a device list of a plurality of connected external devices; and
   generating and displaying the device list of the plurality of connected external devices,
   wherein if one of the plurality of connected external devices in the device list is selected, the judging comprises transmitting a request message, to the selected external device, inquiring whether the control ownership exists in the selected external device.

7. The method of claim 6, further comprising controlling an operation of the first external device in accordance with a selection command if the selection command is inputted in a state that the control ownership is registered in the first external device.

8. The method of claim 6, further comprising receiving a signal outputted from the first external device under the control of the second external device if it is determined that the second external device having the control ownership of the first external device exists.

9. The method of claim 6, further comprising:
changing the registration of the control ownership of the first external device if an approval message is received from the second external device in response to the request message; and
displaying an error message on a display screen if the approval message is not received from the second external device in response to the request message.

10. The method of claim 6, wherein the first external device is at least one of an MPEG camcorder, an audio/video hard disk drive (AVHDD), and a D-VHS, and the second external device is at least one of a DTV, a PC, and a set-top box.

11. The image display device of claim 1, wherein the determining unit determines whether the second external device having the control ownership of the first external device exists by confirming whether information indicating that the second control device has the control ownership is stored in the first external device.

12. The method of claim 6, wherein the iudging determines whether the second external device having the control ownership of the first external device exists by confirming whether information indicating that the second control device has the control ownership is stored in the first external device.

* * * * *